Patented May 2, 1944

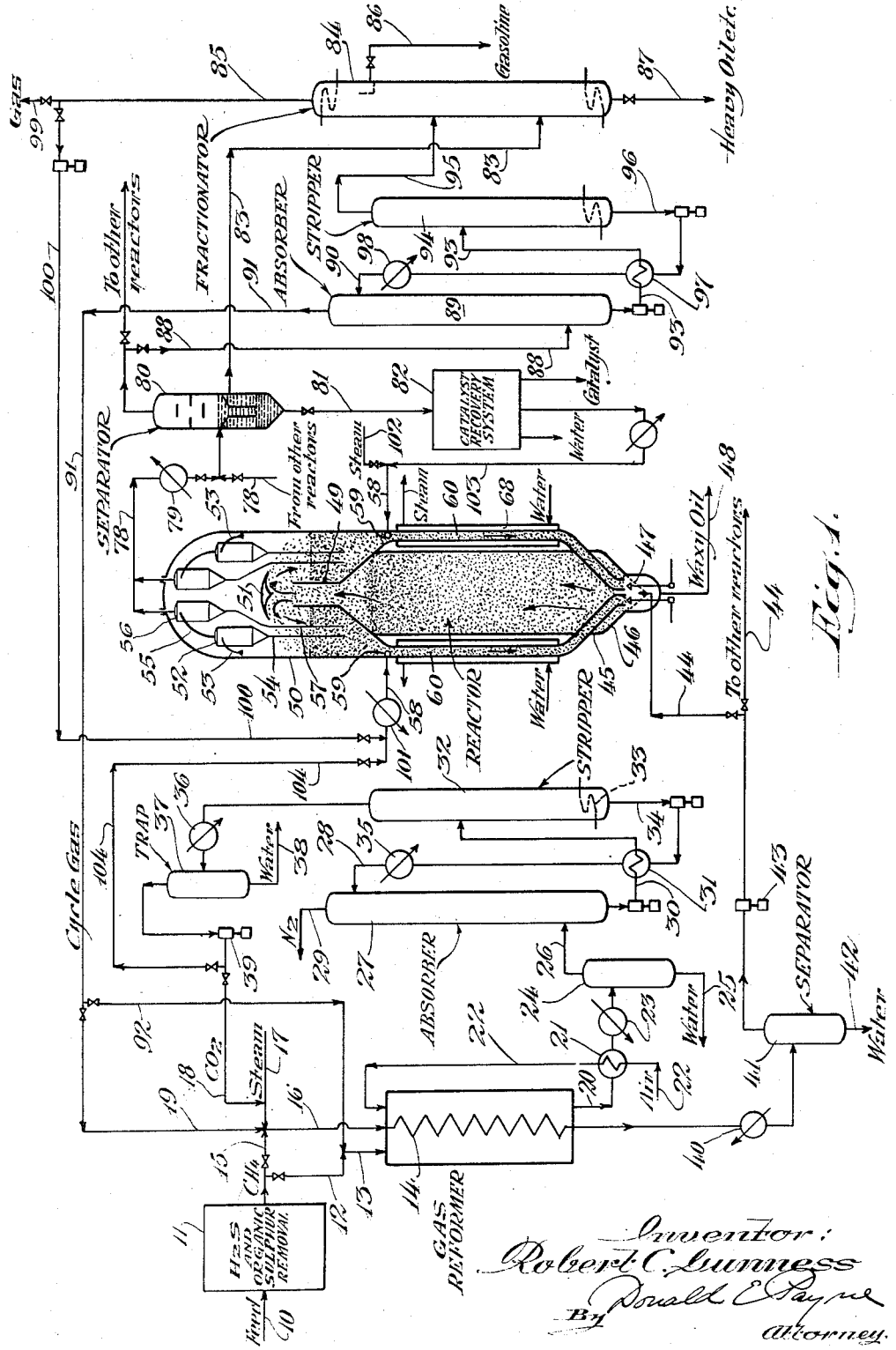

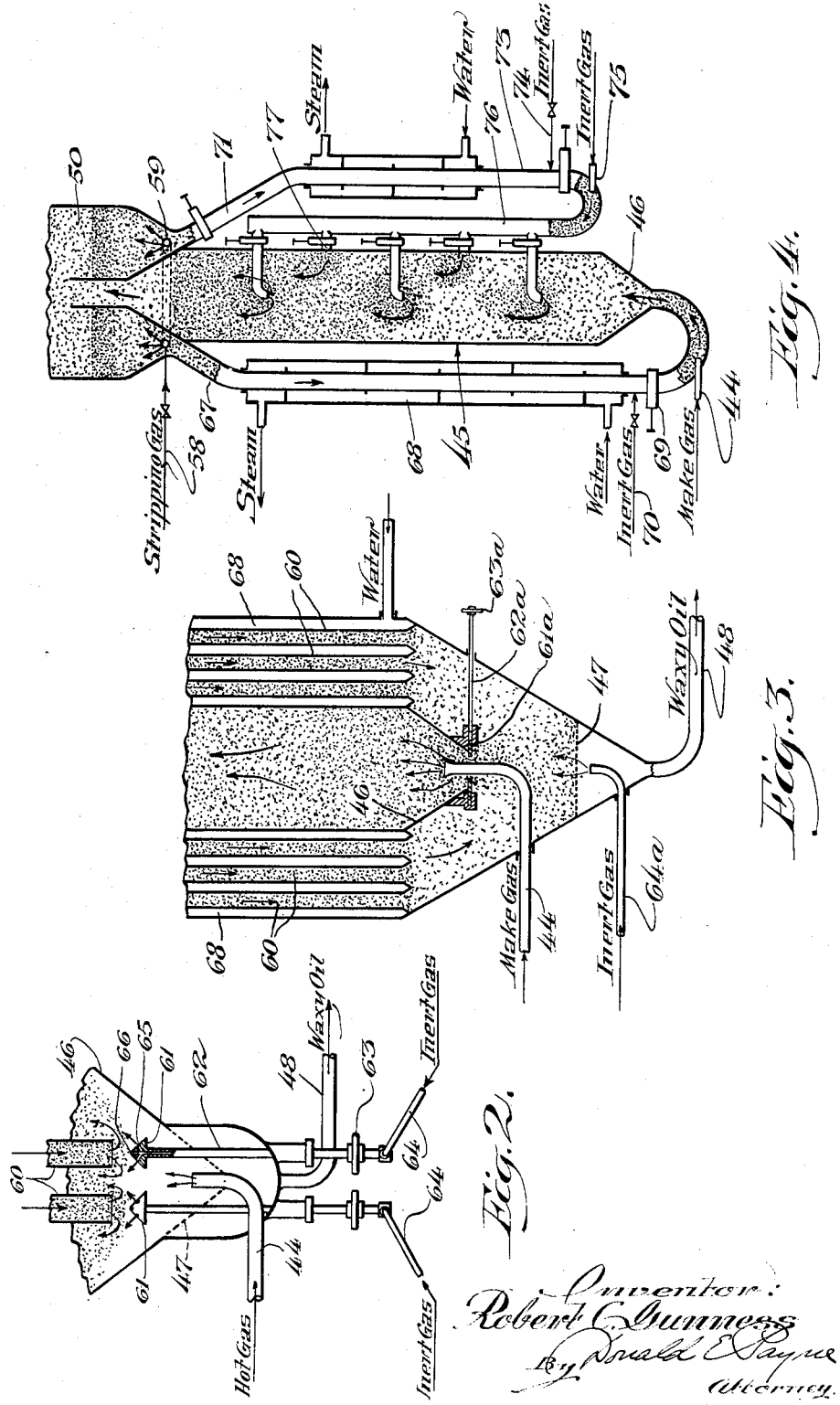

2,347,682

UNITED STATES PATENT OFFICE 2,347,682

HYDROCARBON SYNTHESIS

Robert C. Gunness, Chicago, Ill., assignor to Standard Oil Company, Chicago, Ill., a corporation of Indiana Application April 24, 1941, Serial No. 390,203

4 Claims. (Cl. 260—449.6)

This invention relates to an improved method and means for effecting the synthesis of hydrocarbons from carbon monoxide and hydrogen in accordance with the following equation:

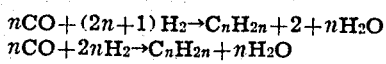

$$nCO + (2n+1)H_2 \rightarrow C_nH_{2n+2} + nH_2O$$
$$nCO + 2nH_2 \rightarrow C_nH_{2n} + nH_2O$$

Heretofore a major problem in this synthesis has been that of heat removal and temperature control. The synthesis is catalytic and it has been necessary to have each catalyst particle immediately adjacent a heat exchange surface. i. e., within a few millimeters thereof. Prior synthesis reactors have, therefore, been extremely complicated and expensive and it has been most difficult to obtain access to the inner part of a synthesis reactor for the purpose of repair or for replacing catalyst material. An object of my invention is to provide a system wherein heat exchange surfaces may be entirely eliminated from the synthesis zone and wherein the heat developed by the synthesis may be removed in a separate zone. A further object is to provide a system wherein the synthesis temperature may be controlled and maintained within very close limits. A further object is to provide a simple and relatively inexpensive synthesis reactor which is more efficient in operation than the expensive and complicated reactors heretofore employed.

The catalyst employed for effecting the synthesis is expensive and it is essential that catalyst losses be maintained at an absolute minimum. An object of my invention is to provide improved methods and means for preventing catalyst losses from synthesis reactors.

The synthesis has heretofore been effected in fixed catalyst beds so that the catalyst in one portion of the bed became spent sooner than the catalyst in another portion of the bed. The carbon monoxide-hydrogen mixture was rapidly converted in the initial portion of the catalyst bed but thereafter the reaction was materially slowed down because of the presence of reaction products, some of which products diluted the carbon monoxide and hydrogen mixture and some of which products coated the catalyst and made it less effective. An object of my invention is to provide a system wherein the incoming carbon monoxide and hydrogen mixture always contacts a catalyst which has been stripped of reaction products, wherein the catalyst activity is substantially uniform throughout the reaction zone and wherein the extent and nature of the conversion may be more closely controlled than in any prior process. A further object is to provide a system which is flexible in operation so that it may be employed under atmospheric or superatmospheric conditions and so that it may selectively produce a large preponderance of hydrocarbons of the motor fuel boiling range, or the lubricating oil boiling range or any other desired boiling range.

A further object of the invention is to provide an improved system for converting hydrocarbon gases such as natural gas into normally liquid or normally solid hydrocarbons and to utilize in this system the methane and ethane which is produced in the system itself. A further object is to improve the efficiency and to decrease the expense of the system for obtaining a two to one hydrogen-carbon monoxide mixture from normally gaseous hydrocarbons, particularly methane and ethane. A further object is to provide an improved method and means for purging the system of nitrogen.

A further object of the invention is to avoid or minimize the separation of waxy oil drips from the reaction zone and to provide an improved method and means for stripping reaction products from the catalyst at very short intervals thereby decreasing or eliminating the tendency of reaction products to accumulate in the catalyst mass. Other objects will be apparent as the detailed description of the invention proceeds.

In practicing my invention I may employ normally gaseous hydrocarbons from any source whatsoever but I prefer to employ natural gas which consists chiefly of methane since it is extremely difficult to convert this particular gas into high molecular weight hydrocarbons by any other process. The natural gas is first freed from hydrogen sulfide and organic sulfur compounds by scrubbing with a suitable solvent such as monoethanolamine, triethanolamine, or the like followed, if necessary, by scrubbing with a strong caustic solution. The desulfurized gas is then mixed with such proportion of carbon dioxide and steam as to give a gas mixture having an atomic hydrogen:carbon:oxygen ratio of about 4:1:1. This mixture is then contacted with a reforming catalyst, preferably an VIIIth group metal oxide which is either unsupported or supported on clay, kieselguhr, silica gel, alumina, etc. Such a catalyst, for instance, may be a mixture of the oxides of nickel, iron and manganese with the proportions 1:1:0.5. The nickel or other VIIIth group metal oxide catalyst may be promoted by oxides of aluminum, magnesium, calcium, uranium, chromium, molybdenum, vanadium, etc.

The space velocity through the gas reforming catalyst should be sufficient to give a contact time of about 2 to 60, preferably about 10 to 30 seconds. The temperature of this operation is preferably 1,400 to 1,650° F. and the pressure may be about atmospheric to 150 pounds per square inch or higher. This reforming operation converts the methane-carbon dioxide-steam mixture into a gas consisting chiefly of hydrogen and carbon monoxide in the proportions 2:1. This gas mixture will be hereinafter referred to as "make" gas or "synthesis" gas.

A considerable amount of heat must be supplied for the gas reforming operation. This heat is preferably produced by burning a part of the desulfurized gas admixed with a part of recycled gas from the system. A considerable amount of the heat contained in the flue gas from the gas reformer burner may be used for preheating air which is to be charged to the burner. Water is then separated from the cooled flue gas and the flue gas is scrubbed with suitable solvent such as monoethanolamine for absorbing carbon dioxide therefrom. The undissolved nitrogen is expelled from the system. The carbon dioxide is recovered and employed along with desulfurized gas and steam for the production of make or synthesis gas as hereinabove described.

My synthesis reactor is preferably a vertical tower which contains no heat exchange surfaces therein. Catalyst is suspended in this tower by the up-flowing make gas. By properly controlling the upward velocity of the make gas in the tower and the amount of powdered catalyst introduced into the tower I may control the amount of catalyst in the tower and the synthesis gas residence time in the tower, thus obtaining the contact of a given quantity of synthesis gas with any desired quantity of catalyst for any desired time.

With a catalyst bulk density of about 10 to 40 pounds per cubic foot and with a uniformly small particle size the vertical gas velocity of the make gas will usually be within the range of about .1 to 10 feet per second—in most cases about .5 to 1.5 feet per second but it will depend, of course, on the density, particle size and character of the particular catalyst which is employed as well as upon desired conversion and reaction conditions, such as temperature, pressure, etc. The bulk density of catalyst in the reactor is usually at least about 2 to 10 pounds per cubic foot lower than the bulk density of settled catalyst but the bulk density of catalyst in the reactor should be sufficiently great so that the suspended catalyst mixture will behave as a liquid and exhibit such turbulence that there will be intimate and uniform mixing of the catalyst throughout the reaction zone. The gas velocity should be low enough to obtain and maintain a dense opaque phase of suspended catalyst. It should be high enough to prevent the catalyst from actually settling out of the gases and caking and to continuously carry a substantial amount of the catalyst to an upper settling zone so that it may be cooled and recycled for temperature control.

The temperature of the synthesis step is usually within the range of about 225 to 425° F., the lower temperatures tending toward the production of heavier hydrocarbons such as waxes and the higher temperatures tending toward the production of lighter hydrocarbons such as gases. With ordinary catalysts the synthesis should be effected within a relatively close temperature range of about 325 to 395° F. Maximum liquid yields are obtained at these temperatures with a minimum production of lighter and heavier hydrocarbons.

Temperature control is effected by cooling either catalyst material or incoming gases or both in a zone or zones outside of the synthesis zone. Heretofore it has always been deemed essential that the entering gases should be at synthesis temperature and that heat exchange surfaces be provided within a few millimeters of each catalyst particle in the synthesis reactor. By maintaining the turbulent gas suspension of catalyst particles in the reactor as hereinabove described I have discovered that the temperature is substantially the same in all parts of the reactor. Thus instead of employing the heat of synthesis for boiling water in the synthesis zone, as in previous processes, I employ the heat of synthesis for bringing make gases and introduced catalyst to reaction temperature.

Since reaction temperature is reached substantially instantaneously I maintain the reaction temperature within closer limits than was possible in the cumbersome heat reactors heretofore employed. In other words, the relatively cool catalyst which is constantly being injected into the reactor is instantaneously dispersed throughout the reactor and each particle of such catalyst is in initimate contact with catalyst particles at the surface of which heat is being liberated. Since each particle of catalyst is surrounded by a gas envelope and is in intimate contact with other catalyst particles there is no possibility of the development of hot spots or overheating. An important feature of my invention is this remarkably efficient and effective means of obtaining temperature control in the synthesis reactor.

Another feature of my invention is a method and means for obtaining complete separation of catalyst from gases and vapors and the recycling of this catalyst through suitable coolers to the synthesis reactor. I provide an enlarged settling zone above the reactor and within this settling zone I may provide a plurality of centrifugal separators. The settled catalyst is intimately mixed with centrifugally separated catalyst and this mixture of catalyst is stripped with hot gas before it is cooled for reintroduction into the synthesis zone in order to prevent the accumulation on the catalyst particles of heavy reaction products such as oils or waxes. Thus while in prior processes the initial make gas originally contacted a catalyst which was wet with reaction products, I have provided a process wherein the initial make gas contacts a catalyst which has been freed from reaction products.

The reaction products are cooled for the separation of water and any traces of catalyst not removed by cyclone separators (or by electrostatic precipitators if such are employed) may be recovered with the condensed water and reworked for the preparation of new catalyst. Alternatively the steam for stripping may be obtained by flashing the aqueous catalyst slurry so that the stripping steam will reintroduce this catalyst into the body of catalyst which is being recirculated through the cooler to the reactor. Carbon dioxide may likewise be used as the stripping gas and then carried with recycled methane, etc. to the gas reforming step for the preparation of synthesis gas.

The reaction products may be fractionated in any conventional manner but I prefer to employ an absorption system for separating $C_3$ and $C_4$ hydrocarbons from unreacted make gases, methane, ethane and ethylene. The $C_3$ and $C_4$ hydrocarbons are rich in olefins and may be converted by polymerization, alkylation, gas reversion or other known processes into high quality motor fuels or heavier oils. The stream of separated make gas, which contains considerable amounts of methane, ethane and ethylene, is usually split, a part of it being sent to the gas reformer and a part to the burner of the gas reformer, the size of the latter stream being sufficiently large to keep the system substantially purged from nitrogen.

The invention will be more clearly understood from the following detailed description read in conjunction with the accompanying drawings which form a part of the specification and in which:

Figure 1 is a schematic flow diagram of my entire system;

Figure 2 is a detailed section illustrating the elements in the lower part of the reactor in Figure 1;

Figure 3 is a vertical section of the lower part of a reactor similar to the reactor shown in Figure 1 but offering certain additional advantages, and Figure 4 is a vertical section of modified reactor and catalyst cooling and recycling means.

As a specific embodiment of my invention I will describe a system for handling about 40,000,000 cubic feet per day of a natural gas which consists essentially of methane. The application of the invention to other charging stock and to plants of various sizes will be apparent to those skilled in the art from the following description.

The charging stock from line 10 is first desulfurized in any conventional system 11. When the gas contains no organic sulfur compounds, this desulfurization may be effected in a conventional Girdler process wherein the gas is scrubbed with monoethanolamine or triethanolamine. Hydrogen sulfide may likewise be removed by the Koppers process or by the so-called phosphate process wherein the gas is countercurrently scrubbed in a packed tower with a two mol solution of potassium phosphate. If organic sulfur is present it may be necessary to supplement the extraction process with a concentrated caustic wash. The hydrogen sulfide content should be reduced to at least about .001 grain per cubic foot and this desulfurization may be effected in any known manner. The desulfurization step per se forms no part of the present invention and it will not be described in further detail.

The stream of desulfurized gas from treating system 11 is split, about 11,000,000 cubic feet per day being introduced through lines 12 and 13 to the burner for heating gas reformer coils or chambers 14, and the remaining 29,000,000 cubic feet per day being passed through lines 15 and 16 for passage through said reformer coils or chambers 14 together with steam introduced through line 17, carbon dioxide introduced through line 18 and recycled gas introduced through line 19. The daily charge to the reformer coils may be substantially as follows:

| | Cubic feet per day |
|---|---|
| Methane (from line 15) | 29,000,000 |
| Carbon dioxide | 9,000,000 |
| Steam | 25,000,000 |
| Recycle gas | 40,000,000 |

This gas mixture is passed through a catalyst chamber or coil 14 at a pressure of about atmospheric to 150 pounds per square inch or more, for example, at about 15 pounds per square inch and at a temperature of about 1400 to 1650° F., for example about 1500 to 1550° F. at such space velocity as to give a contact time of about 2 to 60 seconds, for example about 10 to 30 seconds. As above stated, the catalyst for this conversion step may be one or more VIIIth group metal oxides, such as nickel or iron or a mixture of nickel oxide and iron oxide. The catalyst may be promoted by other metal oxides, such as aluminum, magnesium, manganese, calcium, uranium, chromium, molybdenum, vanadium, etc. and it may be supported on any suitable support such as clay, kieselguhr, silica gel, alumina, etc. A catalyst, for example, may be a mixture of the oxides of nickel, iron and manganese with the metals in the proportion 1:1:0.5. No invention is claimed in the catalyst per se and since such catalysts are well known in the art further detailed description is unnecessary.

The heat required for the gas reforming step in this particular example is about 635,000,000 B. t. u. per hour. A considerable amount of heat from the flue gases leaving the gas reformer furnace through line 20 may be utilized for preheating air in heat exchanger 21, the air being introduced by line 22 to support combustion in the gas reformer furnace. Flue gases which have been partially cooled in heat exchanger 21 may be further cooled in heat exchanger 23 to a temperature sufficiently low to permit condensation of water which may be separated from the cooled flue gases in trap 24 and withdrawn through line 25. The remaining gas mixture may be introduced through line 26 into the base of absorption tower 27 wherein it is scrubbed with cool monoethanolamine or other suitable scrubbing liquid introduced through line 28. The nitrogen is not absorbed in the scrubbing liquid and is removed from the top of the tower through line 29.

The rich scrubbing liquid containing carbon dioxide is pumped through line 30 and heat exchanger 31 to the top of stripping tower 32 which is provided with heating means 33 at its base. This scrubbing liquid is withdrawn from the base of the tower through line 34 and pumped through heat exchanger 31 and cooler 35 back to the top of absorber tower 27.

The carbon dioxide removed from the top of tower 32 may be cooled in heat exchanger 36 and passed through trap 37 from which any condensed water may be withdrawn through line 38. The gas from the top of trap 37 passes through compressor 39 to line 18 for the preparation of make gas charge to the gas reformer.

The basic equations for the gas reforming operation may be somewhat as follows:

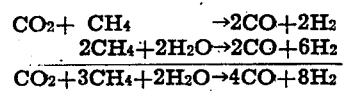

The cycle gas, of course, contains ethane and ethylene as well as methane and unreacted make gas but the reaction of these hydrocarbons is similar to that hereinabove indicated. The proportions of carbon dioxide and steam should in any case be so adjusted as to give a make gas or synthesis gas of about 2 parts hydrogen to 1 part carbon monoxide.

The hot make gas is cooled in cooler 40 to about room temperature or lower and passed through trap 41 from which condensed water may be withdrawn through line 42. The gases are then passed by compressor 43 through line 44 to the base of synthesis reactor 45. In the example herein set forth about 130,000,000 cubic feet per day or about 5,400,000 cubic feet per hour of about 90,000 cubic feet per minute of make gas is thus charged to the synthesis reactor.

The catalyst for the synthesis step may be metallic cobalt or nickel on a suitable carrier such as kieselguhr, silica gel, alumina, etc. with one or more promoting oxides such as oxides of magnesium, thorium, manganese, alumina, etc. For instance, about one part by weight of cobalt may be supported on about two parts by weight of kieselguhr and promoted with a small amount of thorium oxide or magnesium oxide or with a mixture of thorium and magnesium oxides. A mixture of nickel and copper oxides suitably calcined gives a good synthesis catalyst. Ruthenium has also been found to be an excellent synthesis catalyst. The catalysts per se for effecting the synthesis reaction are well known in the art and are described in numerous patents and publications. Since no invention is claimed in the catalyst per se a further description of catalyst composition is unnecessary.

It should be pointed out that in accordance with the present invention the catalyst should preferably be rather finely divided and of fairly uniform particle size. For example, I may employ catalysts having a particle size of from about 100 to 400 mesh or smaller but it should be understood that larger catalyst particle size may be used if gas velocities, reactor designs, etc. are correspondingly modified. The bulk density of the catalyst in settled state may be about 10 to 40 pounds per cubic foot.

My synthesis reactor may consist of one or more vertical towers which may range from about 8 to 40 feet or more in diameter and from about 20 to 50 feet or more in height. The base of the reactor may be provided with an inclined conical hopper or funnel-shaped bottom 46 with a slope of about 60 degrees or more so that there will be no tendency for the catalyst to settle out when the make gases are introduced at the base of this funnel-shaped reactor bottom. Alternatively distributing means may be provided at the base of the reactor for insuring uniform distribution of make gases throughout the reactor chamber and for preventing the catalyst from dropping out of suspension. A screen 47 may be provided below the make gas inlet and a sump may be provided below this screen so that any accumulated waxy oils may be withdrawn through line 48. When my process is operated for the production of relatively light liquid hydrocarbons and the catalyst is effectively stripped, this screen, sump and draw-off will usually be unnecessary and the make gases may be introduced directly at the base of the reactor.

The top of the reactor may likewise be funnel-shaped as shown in the drawings and it may terminate in pipe 49 which extends upwardly in an enlarged settling chamber 50. A baffle 51 may be mounted above the pipe 49 to deflect suspended catalyst particles and uniformly distribute the products and catalyst in the settling space.

A plurality of centrifugal separators may be mounted in the upper part of the settling chamber. For example, one or more primary cyclone separators 52 may pick up, through inlet 53, gases and vapors from which the bulk of the catalyst has been settled out. Additional catalyst removed from the gases and vapors in the primary centrifugal separator may be returned to a point well below the surface of settled catalyst by means of dip leg 54, the head of settled catalyst in the dip leg balancing the difference between the pressure in the settling chamber and the pressure in the primary cyclone separator.

Gases and vapors from the primary separator may be introduced by line 55 into one or more secondary cyclone separators 56 which are provided with dip legs 57. Here again the head of catalyst in the dip leg will balance the difference between the pressure in the settler and the pressure in the cyclone separator. Each dip leg may be provided with an externally operated valve and with steam connections above and below the valve so that if any dip leg becomes clogged, it may be freed of clogging material by closing the valve and blowing both ways with steam. Any number of stages of cyclone separation may be employed and, if necessary or desired, an electrostatic precipitator, such as a Cottrell precipitator, may be employed for the recovery of catalyst fines.

The recovered catalyst settles in the annular space between pipe 49 and the walls of chamber 50, this space serving as a hopper for recovered catalyst and a storage tank into which fresh catalyst may be charged at the beginning of an operation or introduced from time to time during the operation for the purpose of making up any catalyst losses. The settled catalyst in this upper hopper is maintained in an aerated and fluent condition by the introduction of a hot stripping gas such as steam, hydrocarbon gases, or carbon dioxide through line 58. A number of such pipes may be employed at spaced points around the base of the hopper or a perforated annular pipe 59 may be placed at the base of the hopper and supplied with stripping gas through line 58. The stripping gas not only serves to maintain the catalyst in fluent or liquid-like form but it serves the very important function of removing reaction products from the settled catalyst and thus prevents an accumulation of hydrocarbon liquids on the catalyst which might impair catalyst activity or interfere with proper catalyst suspension in the reactor.

The catalyst flows from the base of the upper hopper through a plurality of cooling tubes 60 which are surrounded by jackets 68 containing a heat exchange fluid such as water. These tubes discharge the catalyst into the lower part of the reactor.

The cooling system may be of various modifications. I may withdraw catalyst from the hopper in one or more large conduits, pass the catalyst through the tubes of a tubular heat exchanger and then return the catalyst to the reactor chamber. I may simply surround the tubes with water jacket coolers as illustrated in Figure 2. I may surround the synthesis reactor with an annular chamber containing a large number of vertical tubes and I may pass the catalyst from the hopper through these tubes to the lower part of the reactor while circulating a cooling fluid around the tubes in the annular chamber as illustrated in Figure 3. With regard to the catalyst cooler per se, it is preferred that if a tubular heat exchanger is employed that the catalyst be passed through the inside of the tubes and that the ends of the tubes be suitably designed and stream-lined to provide uniform catalyst distribution and to avoid dead spots.

The systems diagrammatically illustrated in Figures 1, 2 and 3 offer the advantage of a gravity syphon effect since the catalyst in the synthesis reactor has a density about 2 to 10 pounds per cubic foot lighter than the density of aerated catalyst in tubes 60. This denser catalyst will flow downwardly without the necessity of employing injection gases or mechanical injection devices.

In the catalyst return system illustrated in Figures 1 and 2, it may be desirable to disperse the returned catalyst in the up-flowing gas stream and it may also be desirable to maintain a slight aeration of the catalyst in the cooling leg in order to insure its fluent properties. To accomplish this purpose I may provide a closure member 61 which is preferably conically-shaped and which is carried by a hollow shaft or stem 62 extending through the reactor wall to external operating means 63. Hydrogen, methane, steam or other inert gas may be introduced through line 64 through the hollow stem and discharged through laterally inclined ports 65 in closure member 61. Alternatively, some or all of this gas may be vented from the center of the closure member through port 66 for supplying aeration gas in pipe 60. Closure 61 is preferably conically shaped so that it acts to deflect and distribute the returned catalyst into the up-flowing gases introduced through line 44. The distribution of the catalyst in the gases is augmented by the gases discharged from lateral ports 65.

In Figure 3 I have illustrated the modification wherein the synthesis reactor is surrounded by an annular chamber containing a large number of vertical tubes. In this modification the outer wall of the annular chamber may be extended to entirely surround the bottom of the reactor. For example, conical bottom 46a may act as a reservoir for introducing aerated catalyst into the reactor through the open end of the conically shaped reactor bottom 46. In this case screen 47 may be mounted in the base of conical bottom 46a and an aerating gas may be introduced through line 64a to maintain the catalyst in aerated and fluent form not only in the bottom chamber 46a but in the cooling tubes 60. Aerating fluid may be introduced at spaced points around the bottom 46a and also at spaced vertical points so as to prevent any settling of the catalyst on 46a and to provide the desired aeration within the tubes 60. Since the catalyst in the reservoir in 46a is in fluent or liquid-like form, it will flow upwardly into the base of the reactor and will be picked up and suspended as a dense phase in the reactor by synthesis gas introduced through line 44. The rate of flow into the synthesis reactor may be controlled by an iris diaphragm valve 61a operated by rod 62a extending through wall 46a to external operating means 63a. It will be understood of course that instead of employing an iris diaphragm valve I may employ a simple slide valve with opposed V-shaped openings or any other valve means for controlling the flow of the fluent catalyst into the reactor.

My invention is not limited to a gravity return of cooled catalyst and in Figure 4 I have illustrated a system wherein the catalyst is externally cooled and then returned to the reactor by means of a suspending gas.

In this case catalyst may be discharged from the hopper of enlarged settling zone 50 through a suitable cooler diagrammatically represented by standpipe 67 surrounded by cooling jacket 68. The standpipe may be provided at its base with suitable slide valve or star feeder 69. The catalyst in this pipe may be aerated by an inert gas introduced through line 70. Cooled catalyst discharged through valve 69 from the base of this standpipe is picked up by make gases from line 44 and dispersed therewith directly into the base 46 of reactor 45.

Instead of injecting the cooled catalyst with incoming make gases I may recycle the catalyst from the upper hopper through pipe 71 to heat exchanger 72 and thence to a standpipe 73 which may be aerated by gas introduced through line 74. Catalyst from the base of this standpipe may be picked up by an inert gas from line 75 and carried thereby through line 76 for introduction at spaced points along the reactor through any one or more of the lines 77. These are only a few examples of the many modifications of systems for cooling the catalyst in an external zone and returning the cooled catalyst for temperature control in the synthesis reactor.

With ordinary catalyst of about 10 to 40 pounds per cubic foot bulk density (in settled condition) and of about 100 to 400 mesh particle size the vertical vapor velocity in the reactor may be from about 0.1 to 10 feet per second, usually 0.5 to 1.5 feet per second. Aeration gas in standpipe should have a considerably lower vertical velocity, for example .005 to .1 or more feet per second.

The actual amount of catalyst in the reactor at any given time will depend upon the activity of the particular catalyst and the particular conversion which is desired. With the cobalt on kieselguhr catalyst promoted by thorium oxide and with the size of plant herein described I may require as much as 30,000 cubic feet of catalyst in the reactor, i. e., about 150 to 200 tons of catalyst. If a single reactor is employed it may be as much as 60 feet high and about 25 to 30 feet in diameter. I may, however, use a number of smaller reactors in parallel since it may be advantageous to use reactors about 15 to 20 feet in diameter and about 30 to 50 feet high. The settling zone may be approximately the same diameter as the reactor or even smaller since there is a marked contraction in the synthesis reaction gas volume. Reactors, settling chambers, etc. may be made of various shapes and sizes without departing from the invention.

In starting up the system I first charge the upper hoppers with catalyst material and charge a heating fluid such as steam to the jackets around pipe 60 so that this catalyst is heated to a temperature of, for example, 380° F. The make gas stream is introduced at the base of the reactor so that it will have a vertical velocity of about 1 foot per second and the powdered catalyst is dispersed and suspended in this up-flowing gas until the reactor is filled with a dense phase of suspended catalyst. After a preliminary soaking period the synthesis reaction is initiated and as soon as there is a temperature rise in the reactor the steam around standpipe 60 is replaced by water. The temperature of this water is controlled by maintaining a regulated pressure on the steam which is produced by its vaporization. Temperature in the reactor may be held within very close limits by regulating the amount of cooling in the tubes or the amount of recycled catalyst, or both. When equilibrium has been established the system functions smoothly and continuously at the chosen temperature which, in this case, may be 380° F.

Liquid reaction products are stripped out of settled catalyst in the upper hopper by stripping gases introduced by lines 58 through distributor 59. The stripped products together with reaction products are taken overhead through line 78, through cooler 79 to separator 80 wherein water separates as a lower layer, oil as an intermediate layer, and gases as an upper layer. The water is withdrawn through line 81 to a catalyst recovery system 82. Catalyst may be sedimented or filtered from the water and worked up into fresh catalyst. Alternatively the catalyst-laden water may be flashed to form steam containing suspended catalyst particles and this steam may be introduced through line 58 so that the catalyst is returned to the upper hopper simultaneously with the stripping of hydrocarbons from catalyst in said hopper.

Oil from the intermediate layer in settler 80 is withdrawn through line 83 to fractionation system 84 which is diagrammatically shown as a single column but which, in actual practice, would consist of two or more columns, the gasoline and lighter fractions being taken overhead from the first column, the gasoline being stabilized in the second column, etc. Since no invention is claimed in this fractionation system it is diagrammatically illustrated as a column from which gases are taken overhead through line 85, gasoline is withdrawn as a side stream through line 86, and heavy oils are withdrawn from the bottom through line 87.

Gases from the top of separator 80 are introduced through line 88 to absorber tower 89 through which an absorber oil, such as naphtha, is introduced through line 90. Unabsorbed hydrogen, carbon monoxide, methane, ethane and ethylene are taken overhead from tower 88 through line 91. A part of this stream, for example about 75%, is passed by line 19 to the gas reformer 14 for the production of further quantities of make gas. The other part of the stream from line 91 is passed by line 92 to line 13 and burned in the gas reformer furnace for supplying heat and carbon dioxide for the gas reforming step.

Rich oil from the base of tower 89 is pumped through line 93 to the top of stripper tower 94 and the light gasoline fractions together with $C_3$ and $C_4$ hydrocarbons are taken overhead from this tower through line 95 to the fractionation system 84. The denuded scrubber oil is then pumped back through line 96, heat exchanger 97, and cooler 98 to the top of absorber tower 89.

The gas from line 85 may be withdrawn from the system through line 99 and charged to any suitable conversion process such as polymerization, alkylation, gas reversion, etc. for the preparation of valuable motor fuels, lubricating oils, etc. Alternatively some of these gases may be passed through line 100, heater 101 and thence through line 58 to be used as a stripping medium in the upper hopper. The temperature of these gases in line 58 should be sufficiently high to effect the vaporization and stripping of any liquid hydrocarbons deposited on the catalyst. Instead of employing hydrocarbon gases for this stripping I may, of course, simply use steam from line 102. If steam is to be employed it may be desirable to flash the catalyst containing water from recovery system 82 and to return the steam so produced together with suspended catalyst solids through line 103. Carbon dioxide from line 104 may be used as the stripping gas, since this gas is eventually recycled to the gas reforming step for the production of further amounts of synthesis gas.

Usually a single synthesis stage with the recycling hereinabove described is sufficient to obtain excellent yields. I may, however, charge the gases from separator 80 to a second synthesis stage which may be similar in design but smaller in size than the stage hereinabove described. With the single stage and recycling as hereinabove described, the following yields of the following products may be obtained:

| | Barrels |
|---|---|
| Light naphtha | 1,500 |
| Heavy naphtha | 1,500 |
| Gas oil | 1,100 |
| Wax | 500 |

The exact yield of various products will, of course, depend upon the particular temperature selected, the nature of the catalyst employed, the time of contact between catalyst and make gas, the amount of catalyst contacted by make gas, etc. Generally speaking, the time of contact may be about 5 to 60 seconds or more, usually at least about 10 to 20 seconds.

The gasoline or naphtha produced by this process is usually characterized by a fairly low knock rating and I may subject it to a catalytic reforming process of the type in which its vapors are contacted with a clay type catalyst of the silica-alumina type at a temperature of about 850 to 1000° F., a pressure of about atmospheric to 50 pounds per square inch and a space velocity of about 4 to 40 volumes of liquid feed per volume of catalyst space per hour. Alternatively the vaporized naphtha may be contacted at a temperature of about 850 to 1050° F., usually about 925 to 950° F., at a pressure of about 50 to 600 pounds per square inch, preferably about 200 to 300 pounds per square inch, at a space velocity of about 0.2 to 2.0 volumes of liquid feed per volume of catalyst space per hour, preferably about 0.5 to 1.0 v./v./hr. with an on-stream time of about 1 to 12 hours, preferably about 6 hours and with a catalyst comprising molybdenum oxide or chromium oxide supported on active alumina or the like. In this catalytic reforming process I prefer to employ about 1000 to 5000, preferably about 2500, cubic feet of recycle gas (containing about 40% to 75% hydrogen) per barrel of stock charged. This catalytic reforming of the synthesis gasoline produces large yields of isomerized and aromatized hydrocarbons of very high knock rating.

The naphtha may, of course, be subjected to a gas reversion process together with $C_3$ and $C_4$ hydrocarbons. It may be freed from olefins and its paraffinic components may be isomerized with aluminum chloride or an aluminum chloride complex.

The heavy fractions may be subjected to catalytic cracking for which it constitutes an excellent charging stock.

The waxes produced by my process are valuable by-products per se and by employing relatively low synthesis temperatures and/or high synthesis pressures I may markedly increase the heavy oil and wax yields. By employing relatively high temperatures, such as about 400 to 425° F., I may produce large quantities of light liquid hydrocarbons and normally gaseous hydrocarbons which may be particularly valuable as charging stocks for polymerization, alkylation, gas reversion, or other refining or synthesis processes. All of the products are valuable for chemical synthesis because of their strictly aliphatic character and their freedom from naphthenic and aromatic hydrocarbons (which normally occur in petroleum products and which are so difficult to separate from aliphatic hydrocarbons of similar boiling points).

While I have described in detail preferred embodiments of my invention and have given an example of operating conditions, it should be understood that the invention is not limited to any of the details hereinabove set forth since numerous other operating conditions and modifications will be apparent from the above description to those skilled in the art. The catalyst handling features of the synthesis are claimed in my continuation-in-part application S. N. 516,053, filed December 29, 1943.

I claim:

1. A method of converting low molecular weight hydrocarbon gases into hydrocarbons of higher molecular weight which comprises mixing said hydrocarbon gases with carbon dioxide, recycled gas from the synthesis step hereinafter described and steam in such proportions as to provide an atomic proportion of hydrogen, carbon and oxygen of about 4:1:1, contacting said mixture with a reforming catalyst at a sufficiently high temperature and for a sufficient period of time to convert said mixture chiefly into hydrogen and carbon monoxide whereby a make gas is produced having a hydrogen to carbon monoxide ratio of about 2:1, suspending a synthesis catalyst in said make gas, maintaining the temperature of said catalyst suspension at a level in the approximate range of 225 to 425° F. and substantially constant and uniform by directly admixing relatively cool materials with the mixture in a synthesis zone, continuing said contact of make gas with suspended catalyst in said synthesis zone for a period of time sufficient to effect synthesis, then separating suspended catalyst from gases and reaction products, separating unreacted gases and low molecular weight hydrocarbon gases from higher molecular weight reaction products, and recycling said unreacted gases and low molecular weight hydrocarbon gases to said mixing step.

2. A method of converting low molecular weight hydrocarbon gases into hydrocarbons of higher molecular weight which comprises mixing said hydrocarbon gases with carbon dioxide, recycle gas from the synthesis step hereinafter described and steam in such proportions as to provide an atomic proportion of hydrogen, carbon and oxygen of about 4:1:1, contacting said mixture with a catalyst comprising an VIIIth group metal oxide at a sufficiently high temperature and for a sufficient period of time to convert said mixture chiefly into hydrogen and carbon monoxide whereby a make gas is produced having a hydrogen to carbon monoxide ratio of about 2:1, suspending a synthesis catalyst as a dense phase in said make gas, contacting said make gas with said suspended catalyst in the synthesis zone at a sufficiently elevated temperature and for a sufficient period of time to effect substantial conversion of the make gas into hydrocarbons of higher molecular weight than methane, absorbing the heat of conversion in suspended catalyst in the synthesis zone separating suspended catalyst from unreacted gases and reaction products, removing the heat of conversion from the separated catalyst outside of the synthesis zone, separating unreacted gases and low molecular weight hydrocarbon gases from higher molecular weight reaction products, and recycling said unreacted gases and low molecular weight hydrocarbon gases to said mixing step.

3. The method of claim 2 which includes the further steps of cooling the synthesis catalyst after it has been separated from gases and reaction products and reintroducing said cooled catalyst for absorbing the heat of reaction in the synthesis step.

4. The method of claim 1 which includes the step of introducing a relatively cold make gas into a suspended synthesis catalyst mixture whereby the heat of the synthesis reaction brings the make gas to reaction temperature.

ROBERT C. GUNNESS.